(12) United States Patent
Ming

(10) Patent No.: US 7,341,022 B2
(45) Date of Patent: Mar. 11, 2008

(54) WATERFALL AQUARIUM

(76) Inventor: Liang Wei Ming, #11, Wen Ge 2nd Lane Wu Cun (5th Village) Eastern District Xiao Lan Town (Chrysanthumum Town), Zhongshan City, Guangdong Province (CN) 528415

( * ) Notice: Subject to any disclaimer, the term of this patent is extended or adjusted under 35 U.S.C. 154(b) by 0 days.

(21) Appl. No.: 11/318,032

(22) Filed: Dec. 23, 2005

(65) Prior Publication Data
US 2007/0144449 A1    Jun. 28, 2007

(51) Int. Cl.
A01K 63/04 (2006.01)
B05B 17/08 (2006.01)

(52) U.S. Cl. ............... 119/245; 119/255; 239/17

(58) Field of Classification Search ........... 119/245, 119/255, 248, 259, 267, 269, 253, 74; D30/102, D30/103, 105, 101; 239/17; 210/167.21
See application file for complete search history.

(56) References Cited

U.S. PATENT DOCUMENTS

| 3,057,094 | A | * | 10/1962 | Winkelman | 40/406 |
|---|---|---|---|---|---|
| 4,836,142 | A | * | 6/1989 | Duback | 119/255 |
| D304,246 | S | * | 10/1989 | Ross et al. | D30/102 |
| D349,979 | S | * | 8/1994 | Ulloa et al. | D30/102 |
| 5,429,369 | A | * | 7/1995 | Hurst | 273/243 |
| 5,571,409 | A | * | 11/1996 | Scarborough | 210/167.25 |
| 5,662,066 | A | * | 9/1997 | Reitz | 119/163 |
| 5,738,137 | A | * | 4/1998 | Reinke | 137/132 |
| 5,842,437 | A | * | 12/1998 | Burns | 119/74 |
| 5,901,663 | A | * | 5/1999 | Reinke | 119/259 |
| 6,041,740 | A | * | 3/2000 | Newman | 119/261 |
| 6,149,991 | A | * | 11/2000 | Okuda | 428/13 |
| 6,152,381 | A | * | 11/2000 | Hones | 239/17 |
| 6,405,937 | B1 | * | 6/2002 | Stukenberg | 239/12 |
| 6,447,137 | B1 | * | 9/2002 | Long | 362/96 |
| 6,463,881 | B1 | * | 10/2002 | Reitz | 119/163 |
| 6,527,197 | B1 | * | 3/2003 | Lin | 239/20 |
| 6,527,257 | B1 | * | 3/2003 | Schuld | 261/29 |
| 6,532,898 | B2 | * | 3/2003 | Boschert | 119/245 |
| 6,622,657 | B2 | * | 9/2003 | Northrop et al. | 119/74 |
| 6,776,121 | B2 | * | 8/2004 | Anderson | 119/75 |
| 6,779,739 | B2 | * | 8/2004 | Mulvaney | 239/17 |
| 6,782,567 | B1 | * | 8/2004 | Austin et al. | 4/615 |
| 6,901,925 | B2 | | 6/2005 | Coughlin | 126/500 |
| 7,089,881 | B2 | | 8/2006 | Plante | 119/74 |

* cited by examiner

Primary Examiner—Yvonne R. Abbott
(74) Attorney, Agent, or Firm—Robert E. Howard

(57) ABSTRACT

A waterfall aquarium including an enclosed transparent water tank having an interior and exterior. A water exit conduit communicates the interior of the water tank with the exterior thereof. The water exit conduit includes a hollow tubular body having an exit end and an intake end, with the intake end thereof being located below the exit end. The water tank rests upon a base having an interior and an exterior. A water pump is located within the interior of the base. The water pump has an inlet and an outlet, the inlet communicating with the interior of the base and the outlet communicating with the interior of the water tank. A water receptacle is adapted to receive water from the water exit conduit and return the water to the interior of the base.

14 Claims, 3 Drawing Sheets

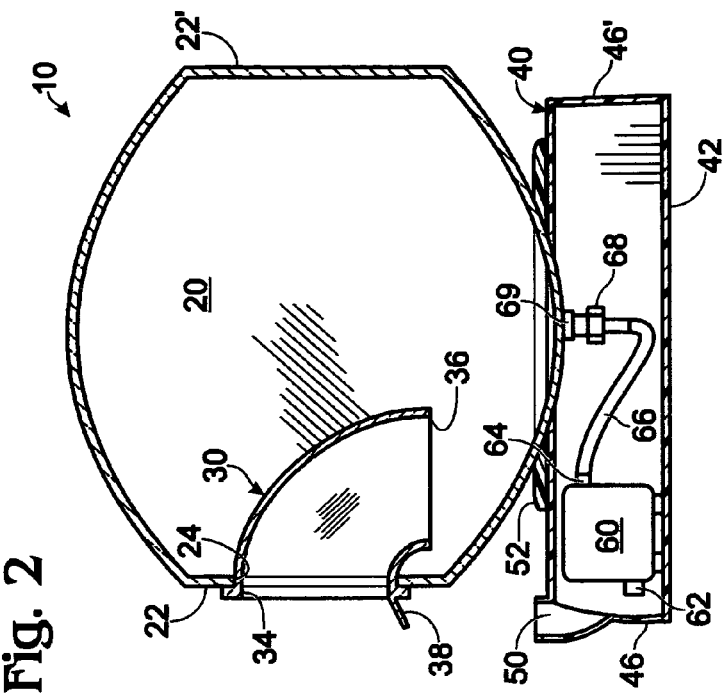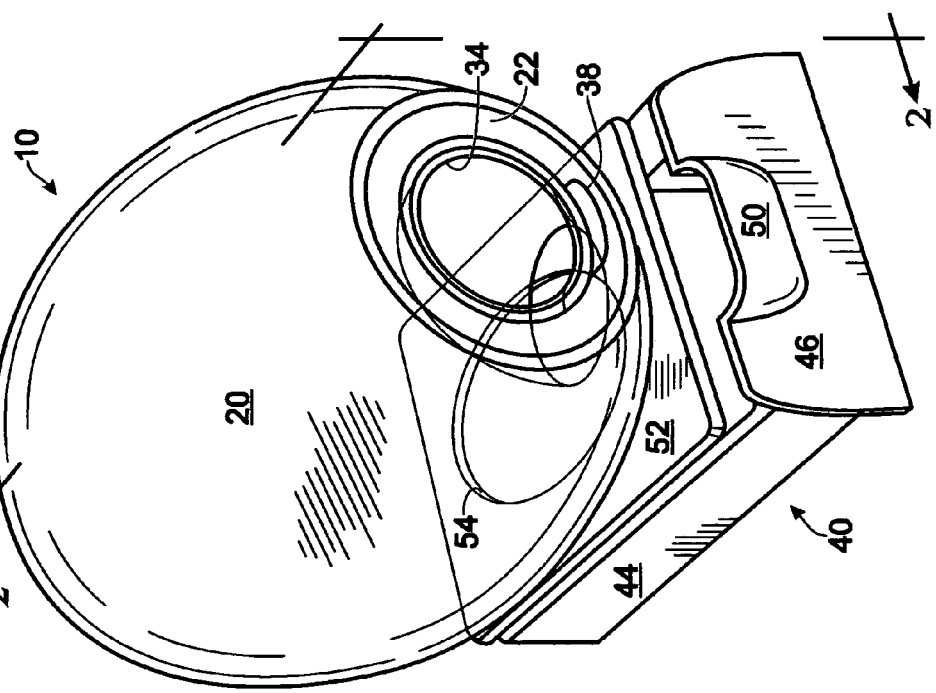

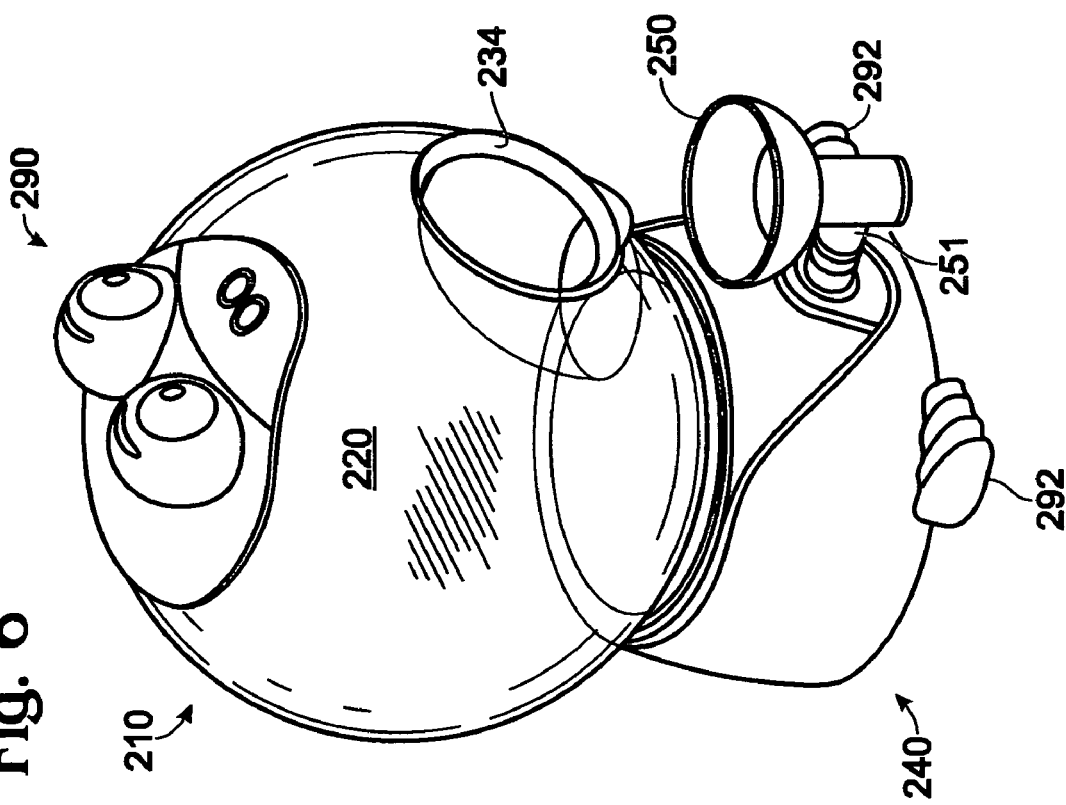
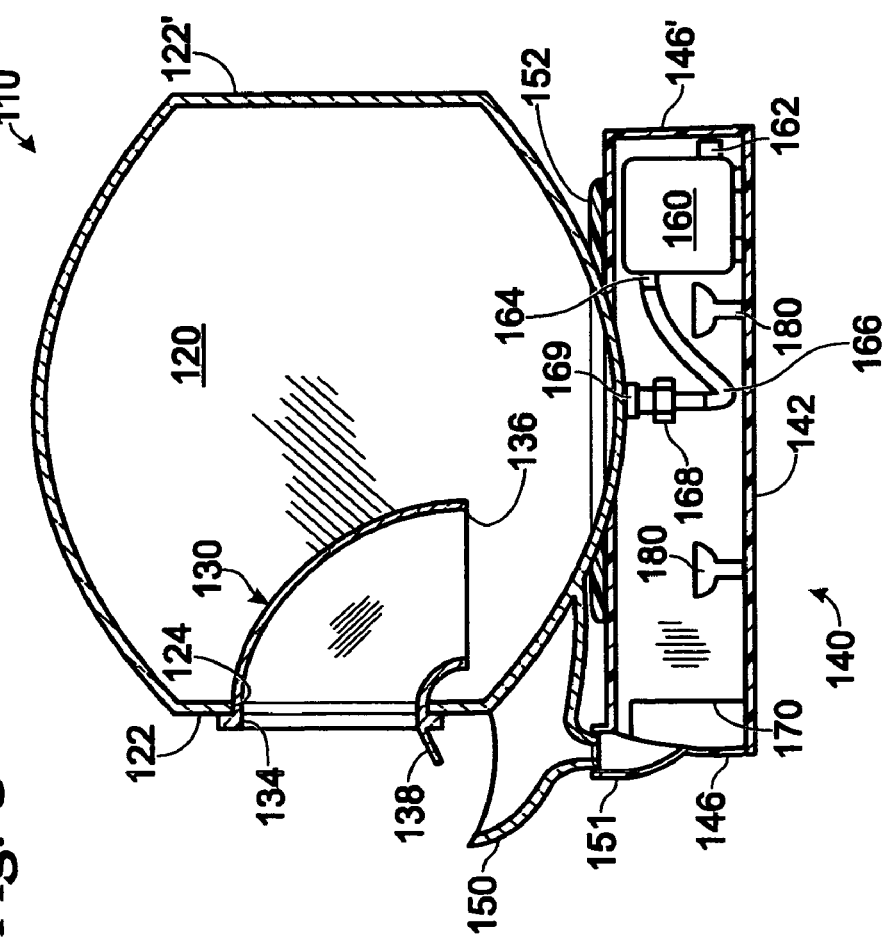

WATERFALL AQUARIUM

BACKGROUND OF THE INVENTION

The present invention relates to a waterfall generating aquarium in which a waterfall is generated outside of the aquarium tank.

The typical aquarium is a transparent tank having an open top. If oxygenation of the aquarium water is required due to the tank being small, or there being too many fish in the tank, aerators are employed to pump air into the water contained in the aquarium tank. Such aerators can be unsightly and unnatural looking.

SUMMARY OF THE INVENTION

It is an object of the present invention to provide aeration to the water of an aquarium tank by generating a waterfall outside of the aquarium tank and recirculating the waterfall water back to the aquarium tank.

The waterfall aquarium includes an enclosed transparent water tank having an interior and exterior.

A water exit conduit communicates the interior of the water tank with the exterior thereof. The water exit conduit includes a hollow tubular body having an exit end and an intake end, with the intake end thereof being located below the exit end.

The water tank rests upon a base having an interior and an exterior. A water pump is located within the interior of the base. The water pump has an inlet and an outlet, the inlet communicating with the interior of the base and the outlet communicating with the interior of the water tank.

A water receptacle is adapted to receive water from the exit end of the water exit conduit and return the water to the interior of the base.

BRIEF DESCRIPTION OF THE DRAWINGS

FIG. 1 is a right front perspective view of a first embodiment of the waterfall aquarium of the present invention;

FIG. 2 is a left side elevational view of a first embodiment of the waterfall aquarium, shown in cross-section;

FIG. 5 is a left side elevational view of a second embodiment of the waterfall aquarium, shown in cross section;

FIG. 6 is a right front perspective view of a third embodiment of the waterfall aquarium.

DESCRIPTION OF PREFERRED EMBODIMENTS

The waterfall aquarium 10 includes a water tank 20, a water exit conduit 30, and a base 40.

Tank 20 is formed of a transparent material, such as glass or plastic. In FIGS. 1-4 tank 20 is shown as having the shape of a truncated ovoid (egg shaped). However, other shapes can be used, such as a non-truncated ovoid, sphere (such as the spherical embodiments shown in FIGS. 6 and 7), a cube or other polyhedron, etc.

Figure 3:
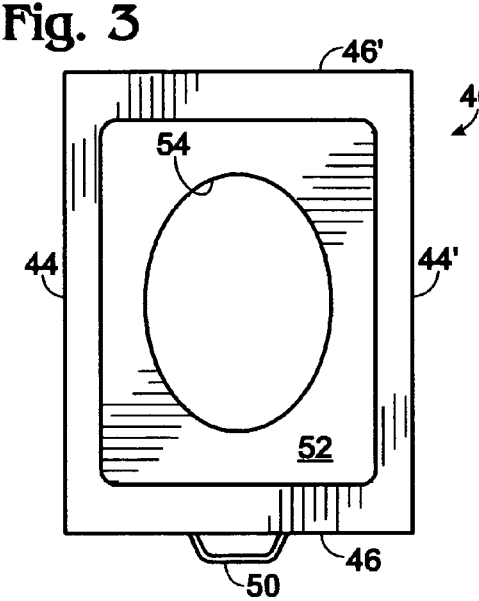
FIG. 3 is a top plan view of the base of the first embodiment of the waterfall aquarium.
Figure 7:
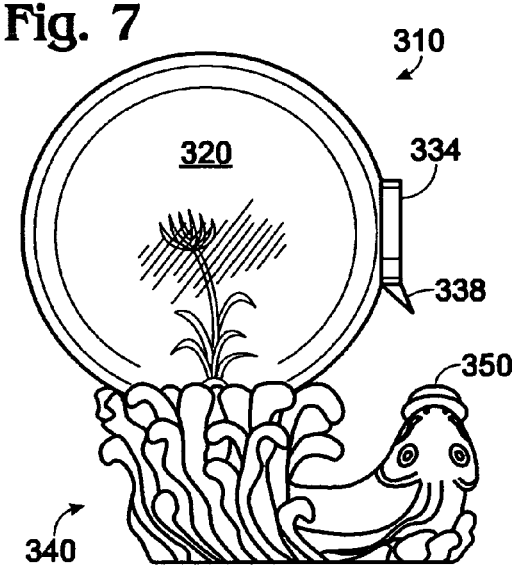
FIG. 7 is a right front perspective view of a fourth embodiment of the waterfall aquarium.

Water tank 20 is shown as having substantially flat front and rear end walls 22 and 22', respectively. The major planes of front and rear end walls 22, 22' are substantially parallel. However, flat front and/or rear end walls 22, 22' can be omitted and be an extension of the oval configuration of water tank 20. FIGS. 6 and 7 illustrate embodiments of the water tank where the flat front and rear end walls have been omitted.

Tank 20 is enclosed except for an opening 24 located in the middle of front end wall 22. Opening 24 is shown as being circular in shape; alternatively, however, non-circular shapes, such as square or rectangular, may be used.

A water exit conduit 30 includes a hollow tubular body 32 having an exit end 34 and an intake end 36. Exit end 34 seats in opening 24 located in one end of tank 20, and is attached thereto by a watertight seal. Exit end 34 has a lower lip 38. Intake end 36 is located below the exit end 34 and extends down towards the bottom of water tank 20. The distance between the intake end 36 and the lower part of exit end 34 is preferably up to at least about 15 mm and about 20 mm at the best.

Water exit conduit 30 has a circular cross-section, conforming to the circular configuration of opening 24 of tank 20. However, the cross-section of water exit conduit 30 can conform to alternative non-circular configurations of opening 24, such as square, rectangular, etc.

Although only one water exit conduit 30 has been shown, more than one such conduit could be placed at other locations in the side of water tank 20.

Base 40 is a hollow body having a bottom 42, side walls 44, 44', and front and rear end walls 46, 46'. Front end wall 46 has a water receptacle 50 extending outwardly therefrom. Water receptacle 50 is in communication with the interior of base 40. Base 40 has a top 52 which has an opening 54 therein having a shape adapted to receive the bottom of water tank 20.

Inside base 40 is a submersible water pump 60 having an inlet 62 and an outlet 64. A tube 66 extends from outlet 64 of water pump 60 to the inlet of a one way valve 68. A water conduit 69 communicates the outlet of one way valve 68 with the interior of water tank 20 in a watertight manner. Suitable wiring, not shown, connects water pump 60 to a suitable power source.

In use, water is placed into water tank 20 and base 40 and air is removed from the inner top of the water tank 20 such as, for example, by means of a bent suction tube inserted through water exit conduit 30 and into the space at the inside inner top of water tank 20. The water level in water tank 20 depends on the amount of air that is removed therefrom. If all of the air in water tank 20 is removed, water tank 20 will be filled with water. Because intake end 36 of water exit conduit 30 is located below the outlet end 34, atmospheric pressure prevents water from exiting conduit 30. Water pump 60 is turned on, and pumps water from the interior of base 40 through tube 66, through one way valve 68 and through water conduit 69 into the interior of water tank 20. Since there is no place for the water to go within water tank 20, either because it is full of water or because of the air pressure in any vacant space in the upper part thereof, water is forced out through water exit conduit 30, across lip 38, and falls down into water receptacle 50 and back into the interior of base 40. Water falling from lip 38 into water receptacle 50 simulates a waterfall, and the falling water is naturally oxygenated by falling through the air. Fish and fish food can be introduced into water tank 20 via water exit conduit 30.

Figure 4:
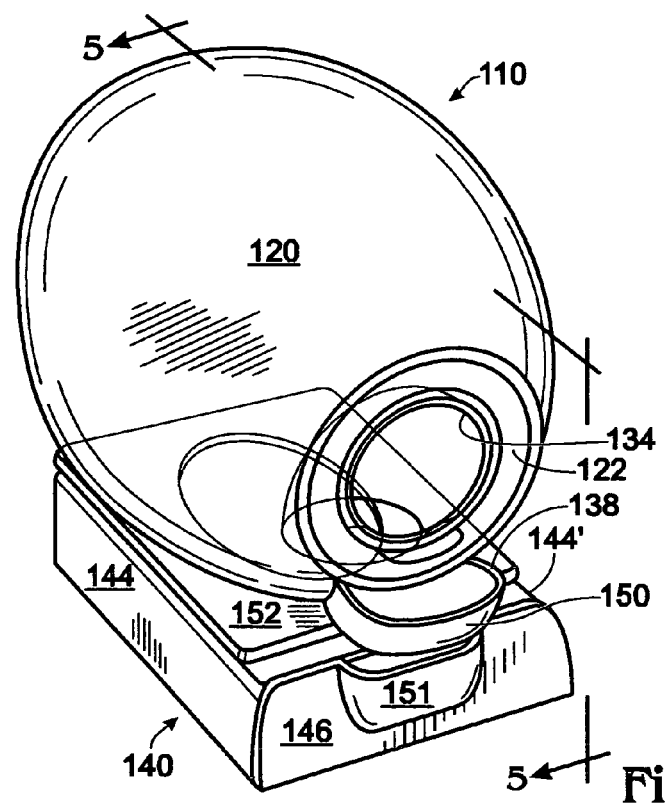
FIG. 4 is a right front perspective view of a second embodiment of the waterfall aquarium.

A second embodiment is shown in FIGS. 4 and 5 wherein those elements common to the first embodiment shown in FIGS. 1 and 2 have common numbers but increased by 100.

The waterfall aquarium 110 includes a water tank 120, a water exit conduit 130, and a base 140.

Tank 120 is formed of a transparent material, such as glass or plastic. Tank 120 is shown as being generally oval in shape. However, other shapes can be used, such as round (as shown in FIGS. 6 and 7), square, rectangular, etc.

Water tank 120 has substantially flat front and rear end walls 122 and 122', respectively. The major planes of front and rear end walls 122, 22' are substantially parallel. However, flat front and/or rear end walls 122, 122' can be omitted and be an extension of the oval configuration of water tank 120, similar to the round (spherical) embodiments of FIGS. 6 and 7.

Tank 120 is enclosed except for an opening 124 located in the middle of front end wall 122. Opening 124 is shown as being circular in shape; however, alternative non-circular shapes, such as square, rectangular, etc. may be used.

A water exit conduit 130 includes a hollow tubular body 132 having an exit end 134 and an intake end 136. Exit end 134 seats in opening 124 of tank 120, and is attached thereto by a watertight seal. Exit end 134 has a lower lip 138. Intake end 136 is located below exit end 134. Water exit conduit 130 has a circular cross-section, conforming to the circular configuration of opening 124 of tank 120. However, the cross-section of water exit conduit 130 can conform to alternative non-circular configurations of opening 124, such as square, rectangular, etc.

Base 140 is a hollow body having a bottom 142, side walls 144, 144', and front and rear end walls 146, 146'. Front end wall 146 has a throat 151 extending outwardly therefrom. A water receptacle 150 is in communication with throat 151, and throat 151 is in communication with he interior of hollow body 142. Base 140 has a top 152 which has an opening therein (not shown but identical to opening 54 of top 52 shown in FIG. 3) adapted to receive the bottom of water tank 120.

Inside base 140 is a water pump 160 having an inlet 162 and an outlet 164. A tube 166 extends from outlet 164 of water pump 160 to the inlet of a one way valve 168. A water conduit 169 communicates the outlet of one way valve 168 with the interior of water tank 120 in a watertight manner.

A water filter 170 can be placed to receive water coming from throat 151 prior to its entry into the inside of base 140 to thereby filter contaminants from the water.

Preferably a plurality of low voltage lights 180 are mounted on the interior bottom 144 of base 140, pointing upwardly so that light is directed into transparent water tank 120. However, a single low voltage light 180 may be used. Suitable wiring, not shown, connects the electrical components located within base 140 to a suitable power source, Waterfall aquarium 110 is used in the same manner as waterfall aquarium 10 discussed above.

FIGS. 6 and 7 show two additional embodiments of the waterfall aquarium of the present invention.

FIG. 6 shows a waterfall aquarium 210 having round (spherical) transparent water tank 220 seated on a base 240. In this embodiment, the waterfall aquarium 210 has been configured to represent a frog having a head 290 mounted on top of water tank 220 and two feet 292 extending outwardly from the front of base 240. Waterfall aquarium 210 functions in the same manner as waterfall aquarium 10. Those elements of waterfall aquarium 210 common to waterfall aquarium 10 have the same numbers but increased by 200.

FIG. 7 shows a waterfall aquarium 310 having round transparent water tank 320 seated on a base 340. In this embodiment, the base 340 of waterfall aquarium 310 has been configured to represent a fish with water receptacle 350 being the mouth of the fish. Waterfall aquarium 310 functions in the same manner as waterfall aquarium 10. Those elements of waterfall aquarium 310 common to waterfall aquarium 10 have the same numbers but increased by 300.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A waterfall aquarium comprising:
an enclosed transparent water tank having an interior and exterior, said water tank having an opening located in a mid-portion thereof;
a water exit conduit including a hollow tubular body having an exit end and an intake end, said water exit conduit communicating the interior of said water tank with the exterior thereof, said exit end being seated in said opening in said water tank and attached thereto in a watertight manner, a lip located adjacent the lower end of said exit end of said water conduit and on the exterior of said water tank, said lip adapted to receive a continuous flow of water from said exit end of said water exit conduit there across to form a simulated waterfall exterior to said water tank, said intake end of said water exit conduit being located below said exit end;
a base upon which the bottom of said water tank rests, said base having an interior and an exterior, a water pump located within said interior of said base, said water pump having an inlet and an outlet, said inlet communicating with the interior of said base, said outlet communicating with the interior of said water tank in a watertight manner; and
water receptacle adapted to receive said simulated waterfall water in a location on the exterior of said base and return said water to the interior of said base.

2. The waterfall aquarium of claim 1 wherein said intake end of said water exit conduit is located below said exit end by a distance of between about 15 mm. and about 20 mm.

3. The waterfall aquarium of claim 1 wherein said water tank is in the shape of an ovoid.

4. The waterfall aquarium of claim 1 wherein said water tank is in the shape of a truncated ovoid.

5. The waterfall aquarium of claim 1 wherein said water tank is in the shape of a sphere.

6. The waterfall aquarium of claim 1 including a one way valve having an inlet and an outlet, the inlet of said one way valve communicating with the outlet of said water pump via a tube, and the outlet of said one way valve communicating with the interior of said water tank via a water conduit.

7. The waterfall aquarium of claim 6 wherein said outlet of said one way valve communicates with the interior of said water tank through the bottom of said water tank.

8. The waterfall aquarium of claim 1 including a water filter located between said water receptacle and the interior of said base, said water receptacle being adapted to return water to said interior of said base through said water filter.

9. The waterfall aquarium of claim 1 including at least one low voltage light mounted within said base in a manner adapted to direct its light into said water tank.

10. The waterfall aquarium of claim 1 wherein said water tank is decorated to imitate an animate object.

11. The waterfall aquarium of claim 10 wherein said water tank is decorated with a frog head.

12. The waterfall aquarium of claim 1 wherein said base is in the shape of an animate object.

13. The waterfall aquarium of claim 12 wherein said base is in the shape of a fish having a mouth adapted to act as said water receptacle.

14. The waterfall aquarium of claim 1 wherein said outlet of said water pump communicates with the interior of said water tank through the bottom of said water tank.

* * * * *